Patented June 24, 1930

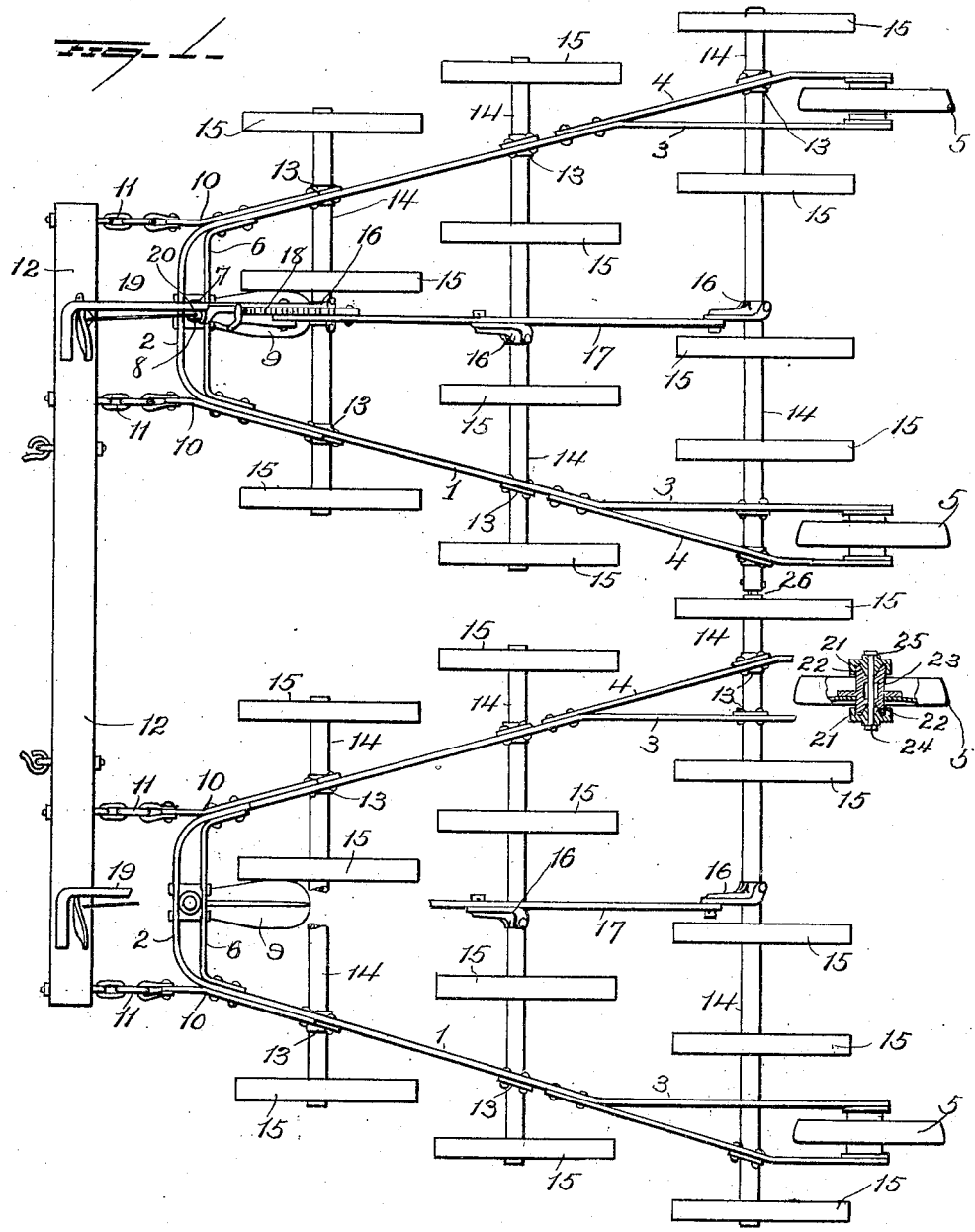

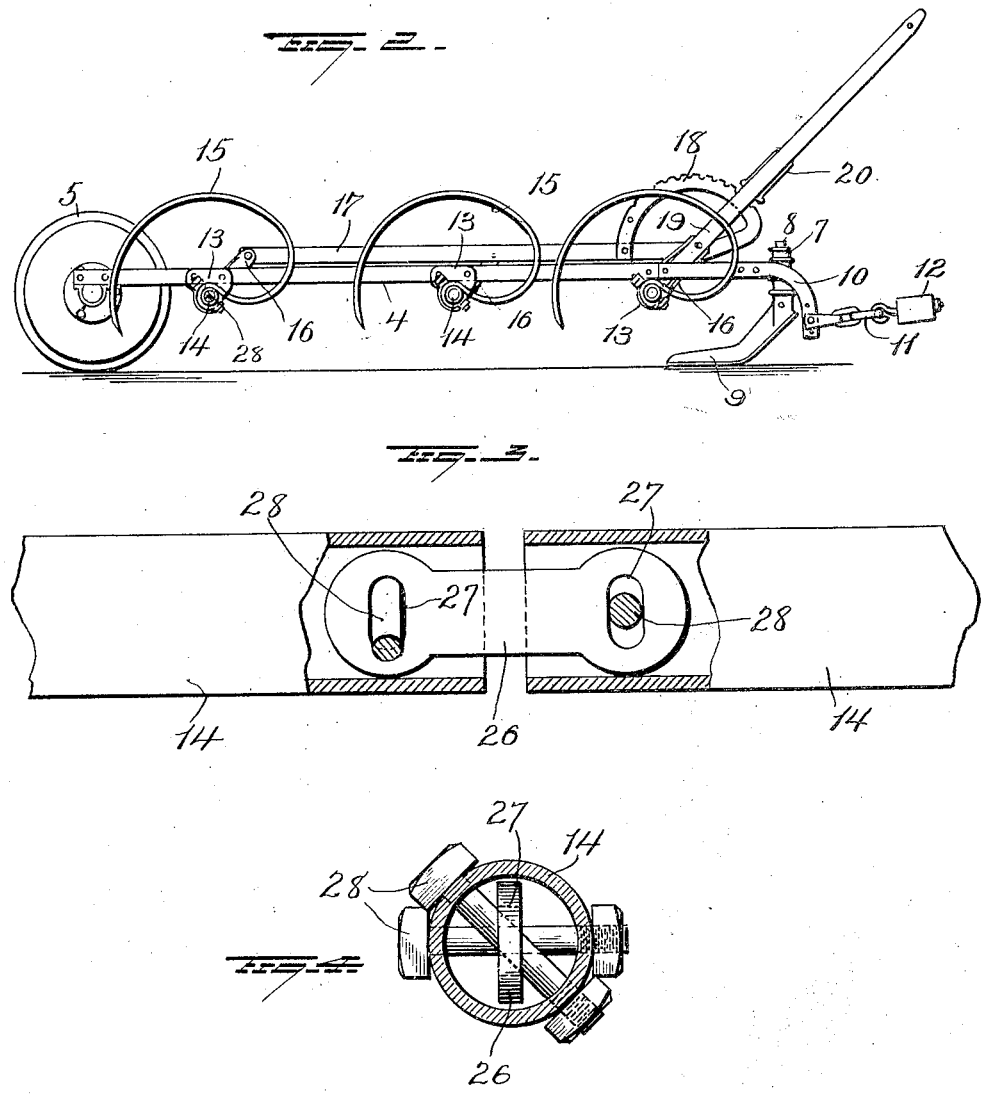

1,767,654

UNITED STATES PATENT OFFICE

WILLIAM D. DEWEND, OF SOUTH BEND, INDIANA, ASSIGNOR, BY MESNE ASSIGNMENTS, TO OLIVER FARM EQUIPMENT COMPANY, A CORPORATION OF DELAWARE

HARROW

Application filed March 22, 1927. Serial No. 177,425.

This invention has for its primary object the provision of a spring-tooth harrow especially adapted for harrowing fields infested with roots and obnoxious weeds and grasses. Secondary objects are to provide a harrow which will readily clear itself and avoid clogging due to roots gathering on any parts, to provide a novel form of frame and to mount the frame in a novel manner whereby the teeth may more evenly engage the ground, and to improve generally the construction of a spring-tooth harrow to the end that the efficiency of the same may be increased. The invention is illustrated in the accompanying drawings and will be hereinafter fully described, the novel features being particularly pointed out in the appended claims.

In the drawings, Figure 1 is a plan view, with a part in section, of a harrow embodying the invention, Figure 2 is a side elevation of the same, Figures 3 and 4 are enlarged detail sections of a flexible coupling which may be employed.

In Figure 1, I have shown the harrow as consisting of two sections, but it is to be understood that a single section may be employed or any number of sections, as desired. The frame of each section is substantially triangular or wedge-shaped and consists of a bar 1 shaped to define side members diverging rearwardly from a front cross member 2 and having their rear extremities bent into parallelism, as shown at 3. To the outer side of each side member or branch of the frame is rigidly secured a frame bar 4 which diverges rearwardly therefrom for a suitable distance and then extends parallel with the end portion of the frame to produce a fork accommodating a rear support shown as a wheel 5. A cross brace 6 is secured to the sides of the frame at the front end of the portion and extends between the same in rear of the front bar 2, and a vertical bearing sleeve 7 is carried by the elements 2 and 6 at the centers thereof, a spindle 8 being swiveled in said sleeve and a shoe or runner 9 being carried by the lower end of the spindle and constituting a front support.

It will be seen that the frame is supported on the ground at three points, by a single runner in front and by two widely spaced wheels at the rear. This arrangement permits the teeth to conform to the uneven surface of the ground and reduces the liability of any of the teeth to be lifted from the ground by the frame supports, especially when harrowing shallow as is the practice for exterminating weeds. The arrangement also facilitates steering and reduces weight without loss of strength.

Draft bars or brackets 10 are secured to sides of the frame at the front end thereof, and draft-applying elements are attached to these brackets when only one harrow section is to be used. When a plurality of sections, however, is employed, chains 11 have their rear ends attached to the brackets and their front ends attached to a transverse draft beam 12 to which all the harrow sections are coupled in a like manner.

Secured rigidly to the frame to depend therefrom, are bearing brackets 13 in which are journaled the tubular tooth bars 14 having the spring teeth 15 rigidly secured thereto. Centrally of each tooth bar, a crank arm 16 is rigidly secured thereto and these crank arms are connected to move in unison by a bar 17 pivoted to the upper ends of the cranks and extending longitudinally of the frame. One end of the connecting bar is formed into an upstanding longitudinally extending toothed sector 18, and a lever 19 is secured to the adjacent crank 16 and equipped with a latch 20 cooperating with the sector whereby the teeth may be set to run at a desired depth and locked in the set position. When the harrow is drawn by a tractor, the lever will be at the front end, as shown, so that it may be easily reached by the operator of the tractor, but when draft animals are used the lever will be arranged at the rear within easy reach of the operator walking behind the implement.

It will be noted that the frame is above the tooth bars and is supported by a single runner at its front end, thus minimizing the probability of its becoming clogged by roots or trash collecting on any of its parts. This avoidance of choking is aided by having the rear wheels located in rear of the rearmost tooth bar. The forwardly-tapering or wedge shape of the frame permits the use of tooth-bars which decrease in length toward the front thereby reducing the weight and decreasing the draft without any loss of efficiency. Furthermore, the draft is applied at two spaced points on the frame and this application of power aids in enabling the teeth to conform to the ground and penetrate to an even depth.

The bearings for the wheels are so constructed that they may be easily tightened to compensate for wear. The bearings are made of chilled iron and comprise brackets 21 secured to the extremities of the rear terminal forks of the frame and having conical bosses 22 on their inner sides, the hub 23 of the wheel having conical sockets in its ends to receive said bosses. The axle is a long bolt 24 extending through both brackets and the hub and equipped with a securing nut 25 which may be adjusted so that the wheel will be permitted to rotate freely but will have no excessive play which would permit it to strike the arms of the fork in which it is mounted.

I also provide a flexible coupling between the rearmost tooth bars of adjacent harrow sections, this coupling being illustrated in Figures 3 and 4. A link 26 has its ends engaged in the adjacent ends of the alined tooth bars, the ends of the link having slots 27 to receive the bolts 28 which are inserted diametrically through the respective bars and held against movement therein, the slots 27 providing flexibility. The rear ends of the harrow sections are thus prevented from moving apart but may follow the surface of the ground independently of each other.

Having fully described my invention what I claim as new and desire to secure by Letters Patent, is:—

1. The combination of harrow sections arranged side by side, hollow transverse members on said sections, said members on one section being axially alined with corresponding members on the other section, a link having its adjacent ends engaged in the ends of alined hollow members and provided with transverse slots adjacent its ends, and bolts passing through the slots in the link and secured diametrically in the respective hollow members, the bolts being in angular relation to each other.

2. A harrow frame consisting of a bar forming rearwardly diverging side members and a cross member integrally connecting the front ends of said side members, a cross brace rigidly secured to and connecting the side members immediately adjacent said cross member, a support mounted upon and disposed between the cross member and the brace at the center thereof, and supports carried by the rear ends of the side members.

3. A harrow frame comprising a bar shaped to define a front cross member and side members diverging rearwardly from the ends of the cross members, frame bars secured to the side members and forming forks with rear extremities of the side members, a support swiveled on the front cross members, and supports mounted in the forks.

In testimony whereof, I have signed this specification.

WILLIAM D. DEWEND.